United States Patent
Guffey et al.

(10) Patent No.: US 6,971,182 B1
(45) Date of Patent: Dec. 6, 2005

(54) MEASURING APPARATUS

(75) Inventors: Shannon Dee Guffey, Philadelphia, PA (US); James Edward Mealor, Homer, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 0 days.

(21) Appl. No.: 10/963,134

(22) Filed: Oct. 12, 2004

(51) Int. Cl.$^7$ ................................................ G01B 5/06
(52) U.S. Cl. ........................................ 33/555; 33/833
(58) Field of Search .......................... 33/549, 555, 556, 33/568, 573, 832, 833

(56) References Cited

U.S. PATENT DOCUMENTS

| | | | |
|---|---|---|---|
| 2,398,171 A * | 4/1946 | Zimmermann | 33/549 |
| 2,592,840 A * | 4/1952 | Bauer | 33/832 |
| 2,717,452 A * | 9/1955 | Richardson et al. | 33/555 |
| 3,639,994 A * | 2/1972 | Palmenberg | 33/555 |
| 4,425,076 A * | 1/1984 | Colineau | 269/303 |
| 4,594,785 A * | 6/1986 | Carlson | 33/833 |
| 4,813,152 A * | 3/1989 | Spencer | 33/832 |
| 4,905,378 A * | 3/1990 | Culver et al. | 33/833 |
| 5,077,909 A * | 1/1992 | Cranor | 33/833 |
| 5,375,341 A * | 12/1994 | College et al. | 33/555 |
| 5,826,345 A * | 10/1998 | Hendricks | 33/833 |
| 2004/0088876 A1 * | 5/2004 | Genal et al. | 33/833 |

* cited by examiner

*Primary Examiner*—G. Bradley Bennett
(74) *Attorney, Agent, or Firm*—Carlos Nieves; David Mitchell Goodrich; William Parks

(57) ABSTRACT

A measuring apparatus is provided comprising: a stage, including three or more pads formed on a surface of the stage, the pads forming an invisible plane and capable of supporting a panel to be measured; a movable measuring stylus, having a tip, the measuring stylus being movable between an initial position, through an insertion region, and a measuring position; a spring, the spring being disposed to apply downward force upon the measuring stylus so that the measuring stylus presses against the panel; a lever, movably mounted on said base, capable of moving the measuring stylus between the initial position, through the insertion region, and the measuring position; and a means for measuring the difference between the height of a tip of the measuring stylus in the measuring position and the height of the invisible plane.

6 Claims, 5 Drawing Sheets

MEASURING APPARATUS

BACKGROUND OF THE INVENTION

Wood has been used as a structural material dating back into prehistoric times, and is still prized as a material today because it has a wide range of desirable material properties including excellent strength and stiffness, pleasing aesthetics, good insulation properties and easy workability. In recent years, however, wood-based alternatives to natural solid wood lumber have been developed that make more efficient use of harvested wood and reduce the amount of wood discarded as scrap.

Plywood, particle board and oriented strand board ("OSB") are some examples of wood-based composite alternatives to natural solid woodlumber that have replaced natural solid wood lumber in many structural applications in the last seventy-five years. These wood-based composites not only use the available supply of timber wood more efficiently, but they can also be formed from lower grade wood species, and even from wood wastes.

While the strength and insulation properties of these wood-based composites are comparable or superior to natural solid wood lumber, it is necessary to carefully monitor the edge of some composite materials because some users have complained that in certain high-moisture environments, the edges of these composite material experience swelling and cracking as water penetrates into the edges. Accordingly there is a need for swiftly, and accurately measuring the thickness of wood composite materials to determine whether the wood composite has undergone edge swelling.

One instrument that is commonly used for measuring edge thickness is a micrometer, which when used with sufficient care can precisely measure the thickness of a wood composite materials in order to obtain a measure of possible edge swelling. Unfortunately, there are also certain difficulties entailed with a micrometer. For example, the use of micrometers often introduces a degree of subjectivity into the measurements because the user can strongly influence how much pressure is exerted on the micrometer, i.e., whether the micrometer was twisted "hard" against the wood or "light" against the wood, a different thickness measurement might be returned, especially on wet samples (because they are more pliant, and sponge-like). Precision is particularly important because even a small amount of edge swelling can result in a material that is noticeably swelled and unsatisfactory to a customer. Accordingly, instruments for measuring edge thickness should be able to render such measurements with a great deal of analytical precision.

Furthermore, micrometers can also be cumbersome and slow during actual usage because the micrometer must repeatedly "spin" and "unspin" the instrument towards and away from the board being measured. The relative speed at which such measurements can be made is important because hundreds or even thousands of measurements are made in a production environment along the edge of the material in order to obtain an accurate measurement of the product being produced.

Accordingly, there is a need in the art for a device that can accurately measure the thickness of the material, particularly the thickness of the material at its edge. Furthermore, such an instrument should be able to make these measurements quickly and efficiently so that the thickness of the material can be readily and accurately assessed. Additional advantages, such as portability and ease of use, are also desirable.

BRIEF SUMMARY OF THE INVENTION

The present invention includes a measuring apparatus including a stage, including three or more pads formed on a surface of the stage, the pads forming an invisible plane and capable of supporting a panel to be measured; a movable measuring stylus, having a tip, the measuring stylus being movable between an initial position, through an insertion region, and a measuring position; a spring, the spring being disposed to apply downward force upon the measuring stylus so that the measuring stylus presses against the panel; a lever, movably mounted on said base, capable of moving the measuring stylus between the initial position, through the insertion region, and the measuring position; and a means for measuring the difference between the height of a tip of the measuring stylus in the measuring position and the height of the invisible plane.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
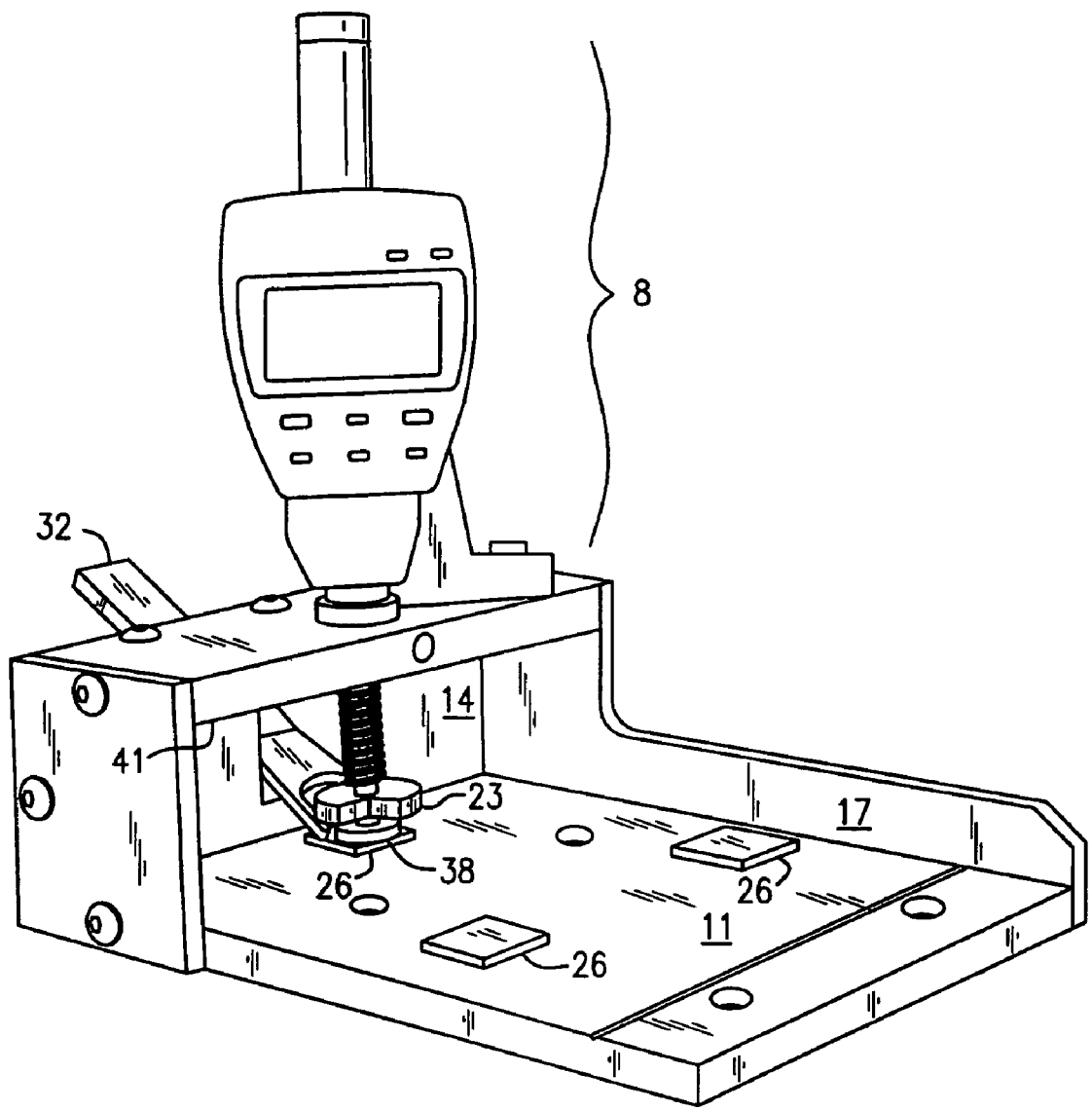
FIG. 1 is a perspective view of a measuring device, depicting a preferred embodiment of the present invention.
Figure 5:
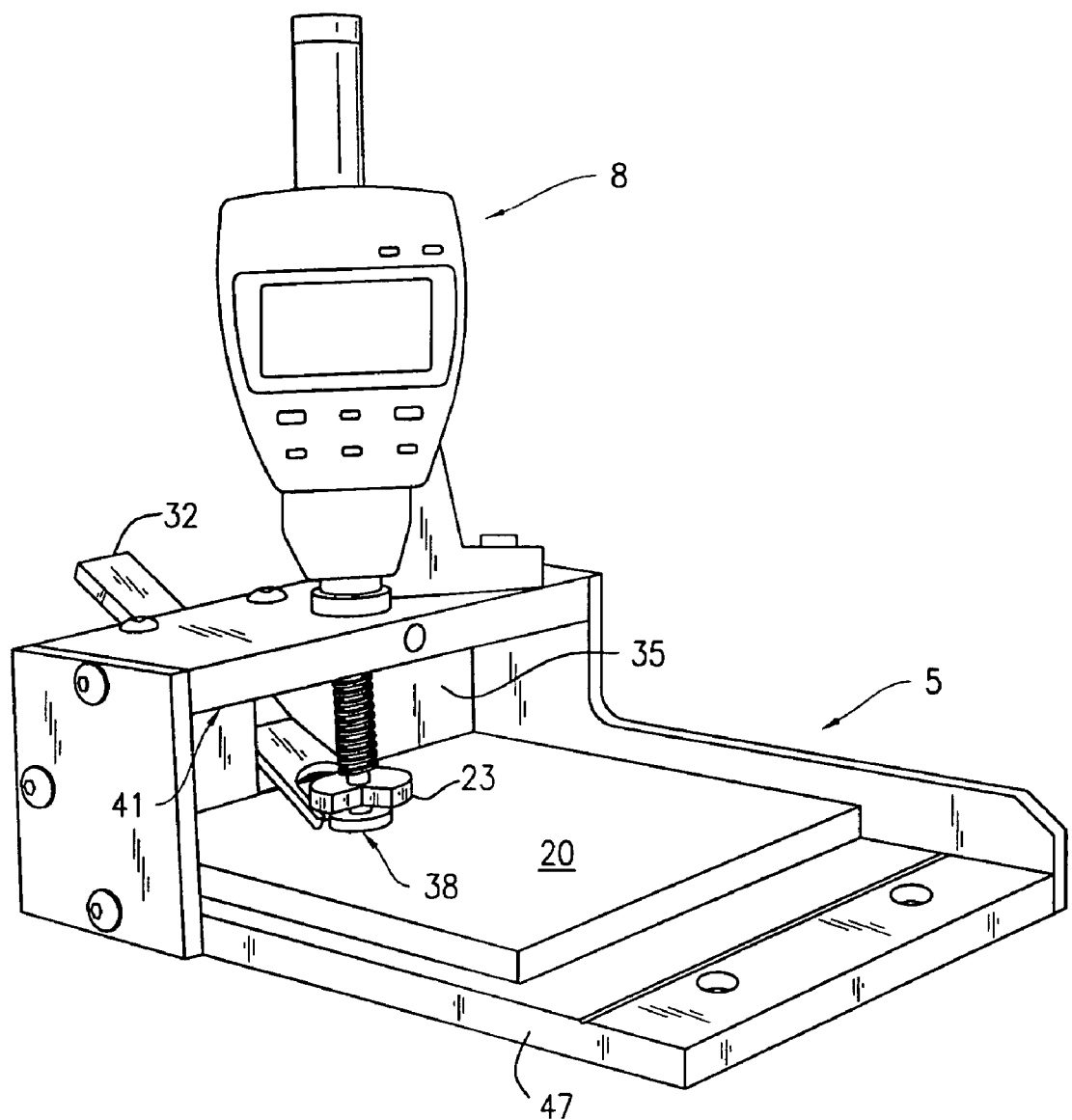
FIG. 5 is a perspective view of a measuring device, depicting a preferred embodiment of the present invention.

Referring now to the drawing of the apparatus in FIGS. 1 and 5, it can be seen that the apparatus includes at least two components, namely a stage 5 and a measuring arm 8. The stage includes a base 11, a rear plate 14, and a raised fence 17. It is preferable that the base 11, rear plate 14, and raised fence 17 are designed to exactly accommodate the size of the sample so that when a sample 20 is inserted into the apparatus, it fits snugly into place against the rear plate 14 of the stage 5 and the raised fence 17 (as shown in FIG. 5), the measuring stylus 23 is positioned to measure the thickness of the sample midway along the one of the four edges of the square sample 20. When the sample 20 fits snugly against both the rear plate 14 and the raised fence 17, the measuring stylus 23 rests of the surface of the sample a certain distance (such as 1 inch) from the edge toward the interior of the sample as required by ASTM D1037. The stage is preferably designed to accommodate a six-inch square sample, although different size samples may be used.

Figure 2:
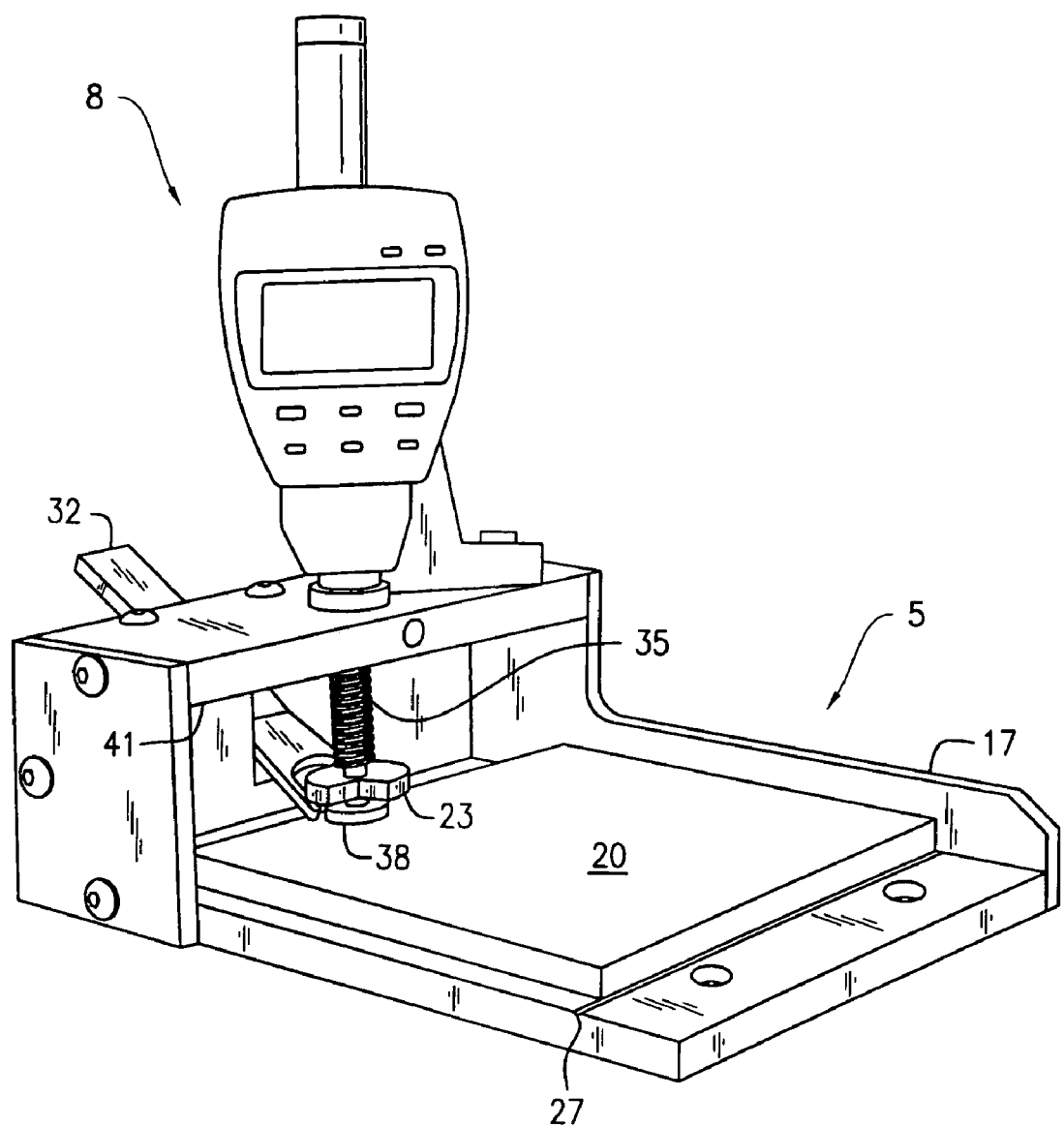
FIG. 2 is a detailed perspective view of the machine illustrated in FIG. 1.

Another implementation of the present invention is illustrated in FIG. 2. As shown in FIG. 2, the stage includes a base 11, a rear plate 14, and a raised fence 17. There is a scored line 27 in the stage 11. When the edge of the sample being measured is positioned away from the rear plate 14 but fit snugly against raised fence 17 such that the opposing edge of the sample is aligned with the scored line 27 in the base 11, as shown in FIG. 2, the measuring stylus 23 is positioned exactly along the edge of the sample 20. The stage is preferably designed to accommodate a six-inch square sample, although different size samples may be used.

Figure 4:
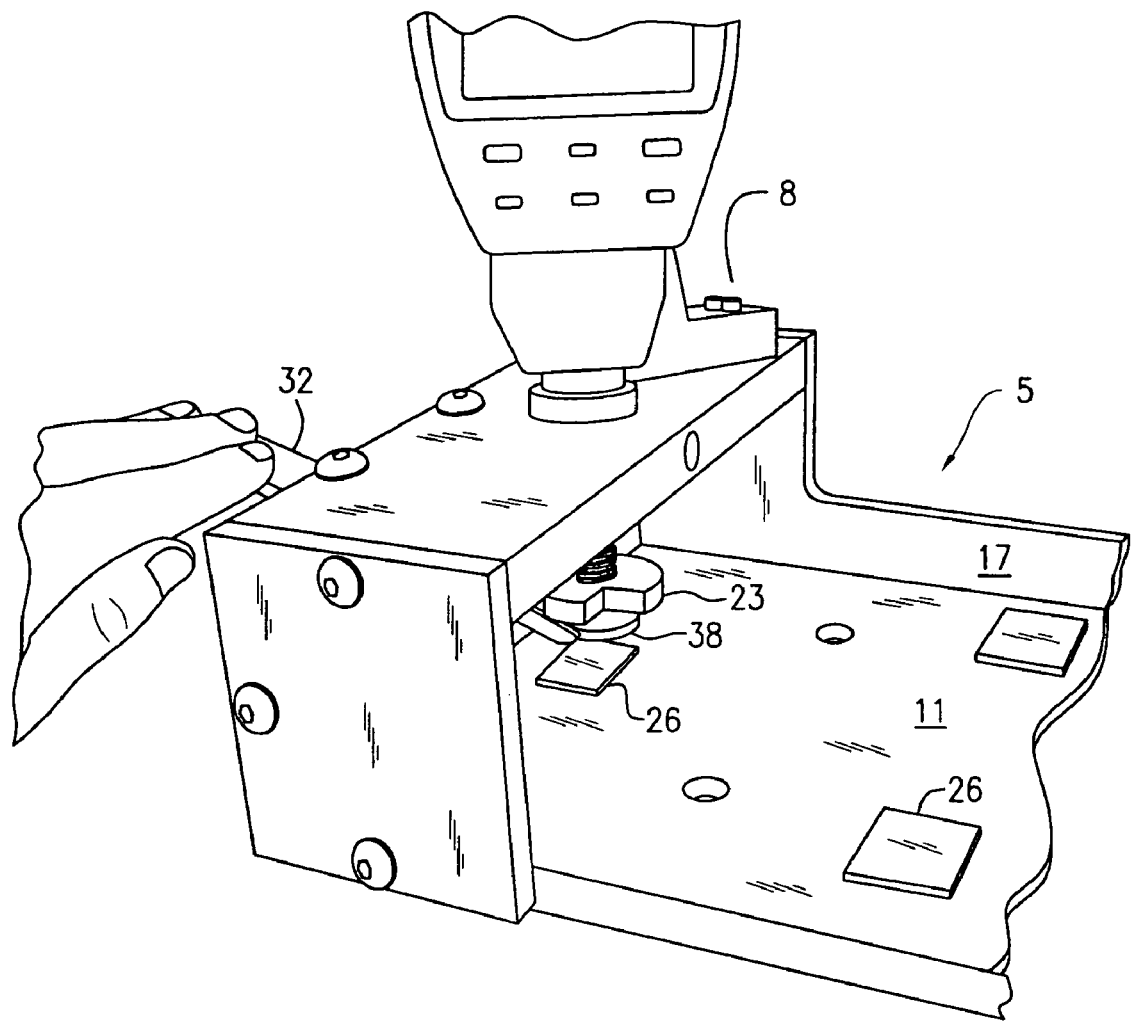
FIG. 4 is a detailed perspective view of the machine illustrated in FIG. 1.

As seen in FIG. 4, the base 11 has a series of raised pads 26, upon which the sample rests. The raised pads 26 define an invisible plane. As can be seen in FIG. 1, one raised pad is placed right below the measuring stylus 23 and functions to "tare" the measuring stylus 23, while the other two raised pads act to hold the entire sample at the tare height, with the bottom of the sample 20 being coplanar with the invisible plane. The thickness measurement using the measuring stylus is made relative to this invisible plane. Additionally, these pads perform the additional important function of raising the level of the sample panel to allow clearance for the swollen edges of the sample 20 so that the swollen edges do not interfere with the measurement by resting on the surface of the stage 5 itself.

At rest, the measuring stylus 23 bears against the base 11. When not in use, the measuring stylus 23 is normally actuated to its lowest position with the stylus 23 itself bearing against the base 11 (or as shown in FIG. 1 bearing against the measuring pad formed on the base) by means of a spring 35 positioned between the top plate 41 of the stage 5 and the measuring stylus 23, and positioned around a shaft (shaft not illustrated). This spring 35 is disposed around a shaft that extends into the measuring arm 8. The configuration of the device with the measuring stylus 23 bearing against one of the measuring pads 26 as shown in FIG. 1 shall be referred to herein as the "initial position".

Figure 3:
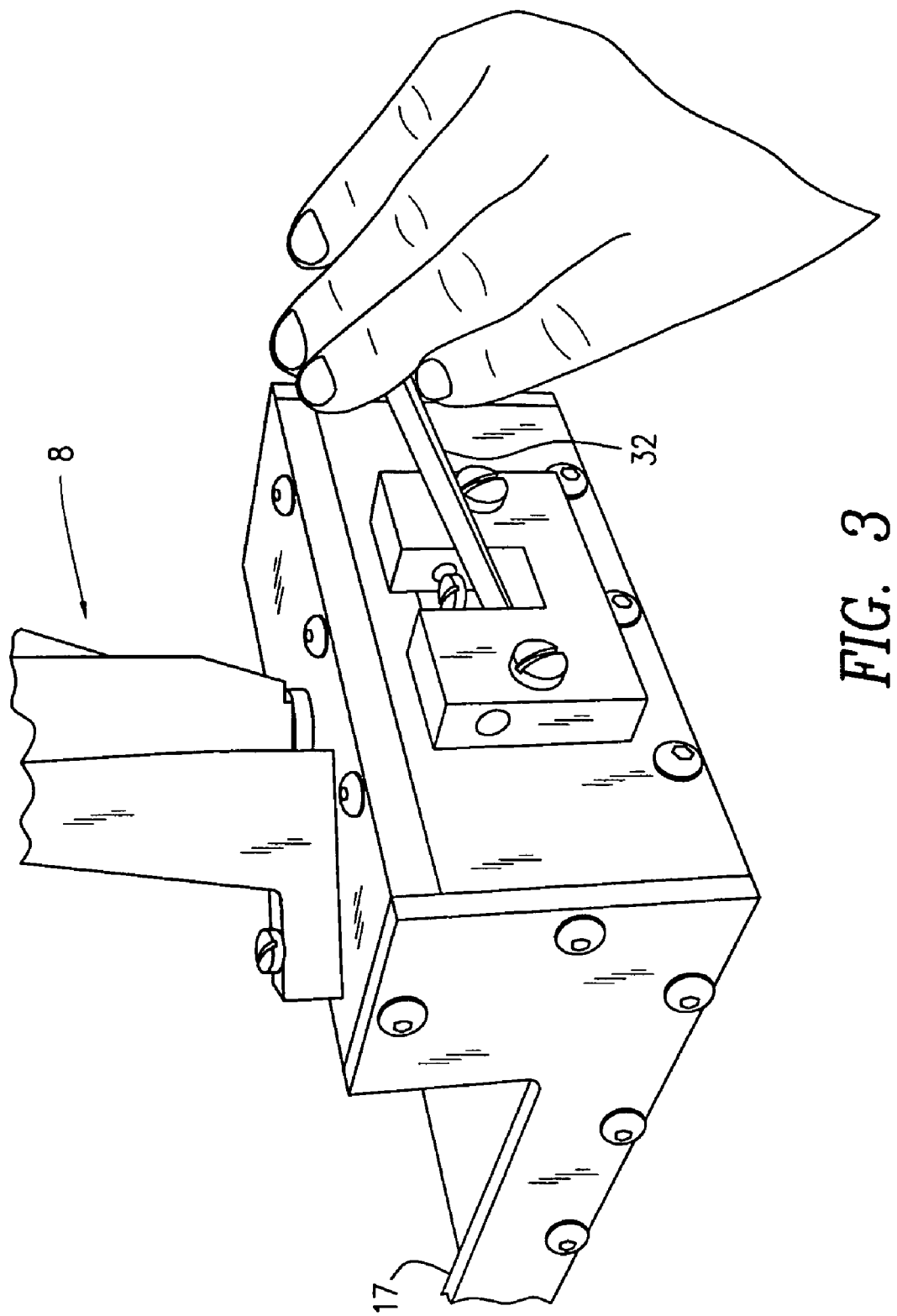
FIG. 3 is a rear perspective view of the machine illustrated in FIG. 1.

A lever 32 is fitted in the rear plate 14 of the stage to contact the measuring stylus 23 and move the measuring stylus 23 so as to insert a sample 20 to be measured. The lever 32 is manually operated and pivotally secured to the rear plate 14. When the lever is depressed by the operator, the lever 32 pivots and pushes upward on the spring 35 pushing it into compression and creating a space (referred to herein as the "insertion region") between the raised pads 26 and the measuring stylus 23 in which the sample 20 can be inserted and rested on the raised pads 26. FIG. 3 is a back view of the apparatus showing the operational part of the apparatus with an operator pressing downward on the lever 32; while FIG. 4 simultaneously shows the lever 32 pivoting and pushing upward on the spring 35 and elevating the measuring stylus 23, to create the space for sample insertion.

After the sample is inserted and rests on the raised pads 26, the operator gradually removes the pressure applied to the lever 32 allowing the spring 35 to extend into tension thereby pushing downwardly on the lever 32 until the tip 38 of the measuring stylus 23 bears and applies pressure against the top surface of the sample 20. This may be denoted as the "measuring position".

When the apparatus is in the measuring position, the height difference between the tip 38 of the measuring stylus 23 and the invisible plane (which is the amount that the measuring stylus is deflected from its rest position) is obtained. The measuring stylus 23 is mechanically connected to an electronic indicator through the shaft (not illustrated) in the measuring arm, which measures the amount that the measuring stylus 23 is deflected and converts it to a measure of the sample thickness. A display on the electronic indicator gives the thickness measurement and a cable attached to the electronic indicator sends the thickness measurement to a computer where the values are recorded. This not only saves time, but prevents the operator from inadvertently recording the wrong measurement value.

Any suitable commercial electronic measurement tool and indicator is acceptable. Suitable such devices are available from Mitutoyo America Corporation, Aurora, Ill.

The measuring stylus 23 itself as can be seen in FIGS. 2 and 4 has a tip 38. The tip may be in form of a "foot" or "shoe". Tip is preferably designed according to one or both of published specifications: (1) the ASTM Standard D1037, and (2) the Voluntary Product Standard PS 2-92 as established under the direction of the Department of Commerce and available in published form from APA/The Engineered Wood Association and the TECO Corporation. Specifically, the tip should have a diameter of between about 10 mm to about 20 mm. Also, the ASTM standard D 1037 specifically states that the diameter of the tip must be sized so that it does not penetrate local indentations on a textured surface; this should also apply to typical surface defects and voids. Additionally, when the apparatus is in the measuring position with the spring pushing downwardly so that the tip 38 of the measuring stylus 23 bears against the top surface of the sample 20, in this position, the tip 38 should be applying between 35 Kpa (5 psi) to 69 KPa (10 psi). The spring rate will vary with the surface area of the tip/disk/foot and must be chosen so that it applies the right amount of pressure. The spring actuated measuring stylus is a particular advantage of the present invention. Previously such thickness measurements were made using a micrometer. This introduced a degree of subjectivity into the measurements, because depending on how much pressure was exerted on the micrometer, i.e., whether the micrometer was twisted "hard" against the wood or "light" against the wood, a different measured thickness might be returned. In the present case, there is consistency across measured board thicknesses, because the spring always exerts the same exact amount of pressure, and human interference with the measurement is at least reduced, if not completely eliminated. Thus, even more highly refined thickness measurements can be made.

Moreover, the use of a measuring base 11 in combination with the measuring stylus 23, lever 32 and spring has another particular advantage in that the combination of these components speed the process of measurement. A micrometer is more time consuming to "spin" and "unspin" the instrument towards and away from the board being measured. With the present apparatus the process is very simple and less time consuming: the measuring stylus 23 is raised, the sample panel 20 is inserted into the stage 5 under the stylus 23, and the stylus 23 is brought down upon the sample 20 and the measurement recorded 20. While such a measurement made using a micrometer might take several seconds, in the present apparatus it can be performed in just a few seconds.

As discussed above, this device is envisioned as being used for accurately measuring the thickness of material, particularly the thickness of of wood composite materials such as oriented strand board, which is described in greater detail in U.S. Pat. No. 6,479,127. The thickness of the oriented strand material is typically between about 0.6 cm (about ¼") to about 5 cm (about 2").

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A measuring apparatus comprising:
   a stage, including three or more pads formed on a surface of the stage, the pads forming an invisible plane and capable of supporting a panel to be measured;
   a movable measuring stylus, having a tip, the measuring stylus being movable between an initial position, through an insertion region, and a measuring position;
   a spring, the spring being disposed to apply downward force upon the measuring stylus so that the measuring stylus presses against the panel;
   a lever, movably mounted on said base, capable of moving the measuring stylus between the initial position, through the insertion region, and the measuring position; and
   a means for measuring the difference between the height of a tip of the measuring stylus in the measuring position and the height of the invisible plane.

2. The measuring apparatus according to claim 1, wherein the means for measuring the difference between the height of a tip of the measuring stylus in the measuring position and the height of the invisible plane is an electronic means.

3. The measuring apparatus according to claim 1, wherein the measuring stylus presses against the panel at a pressure of about 35 KPa to about 70 KPa.

4. The measuring apparatus according to claim 1, wherein the tip has a diameter of about 10 mm to about 20 mm.

5. The measuring apparatus according to claim 1, wherein the panel has a thickness of about 0.6 cm to about 5 cm.

6. A measuring apparatus comprising:
   a stage, including three or more pads formed on a surface of the stage, the pads forming an invisible plane and capable of supporting a panel to be measured;
   a movable measuring stylus, having a tip, the measuring stylus being movable between an initial position, through an insertion region, and a measuring position, wherein the measuring stylus presses against the panel at a pressure of about 35 KPa to about 70 KPa, and wherein, the tip has a diameter of about 10 mm to about 20 mm;
   a spring, the spring being disposed to apply downward force upon the measuring stylus so that the measuring stylus presses against the panel;
   a lever, movably mounted on said base, capable of moving the measuring stylus between the initial position, through the insertion region, and the measuring position; and
   a means for measuring the difference between the height of a tip of the measuring stylus in the measuring position and the height of the invisible plane.

* * * * *